United States Patent
Walker et al.

(10) Patent No.: US 7,658,088 B2
(45) Date of Patent: Feb. 9, 2010

(54) MODULAR DUAL-PURPOSE CHEMICAL DISPENSING SYSTEM FOR LAUNDRY OR WAREWASH

(75) Inventors: Stephen A. Walker, Irvine, CA (US); Michael T. Whiting, Rancho Santa Margarita, CA (US)

(73) Assignee: Knight, LLC, Lake Forest, CA (US)

( * ) Notice: Subject to any disclaimer, the term of this patent is extended or adjusted under 35 U.S.C. 154(b) by 414 days.

(21) Appl. No.: 11/368,357

(22) Filed: Mar. 3, 2006

(65) Prior Publication Data

US 2006/0206238 A1 Sep. 14, 2006

Related U.S. Application Data

(60) Provisional application No. 60/658,277, filed on Mar. 3, 2005.

(51) Int. Cl.
*D06F 39/02* (2006.01)
(52) U.S. Cl. .................................. 68/17 R; 68/207
(58) Field of Classification Search ................ 68/17 R, 68/12.02, 207
See application file for complete search history.

(56) References Cited

U.S. PATENT DOCUMENTS

| | | | |
|---|---|---|---|
| 3,804,297 A | 4/1974 | Jurjans | |
| 3,982,666 A | 9/1976 | Kleimola et al. | |
| 4,687,121 A | 8/1987 | Copeland | |
| 4,733,798 A | 3/1988 | Brady et al. | |
| 4,763,494 A | 8/1988 | der Kinderen | |
| 4,845,965 A | 7/1989 | Copeland et al. | |
| 4,971,714 A | 11/1990 | Lokkesmoe et al. | |
| 4,976,137 A | 12/1990 | Decker et al. | |
| 4,981,024 A | 1/1991 | Beldham | |
| 5,014,211 A * | 5/1991 | Turner et al. | 700/239 |
| 5,389,344 A * | 2/1995 | Copeland et al. | 422/264 |
| 5,390,385 A * | 2/1995 | Beldham | 8/158 |
| 5,435,157 A * | 7/1995 | Laughlin | 68/17 R |
| 5,746,238 A * | 5/1998 | Brady et al. | 137/3 |
| 5,782,109 A | 7/1998 | Spriggs et al. | |
| 5,826,749 A * | 10/1998 | Howland et al. | 222/1 |
| 5,854,557 A | 12/1998 | Tiefnig | |
| 5,870,906 A | 2/1999 | Denisar | |
| 6,035,472 A | 3/2000 | Barbe | |
| 6,055,831 A * | 5/2000 | Barbe | 68/12.18 |
| 6,240,953 B1 | 6/2001 | Laughlin et al. | |

(Continued)

OTHER PUBLICATIONS

European Patent Office 1 400 286 Mar. 2004.*

(Continued)

*Primary Examiner*—Frankie L Stinson
(74) *Attorney, Agent, or Firm*—Stout, Uxa, Buyan & Mullins, LLP; Donald E. Stout (57) ABSTRACT

A modular chemical delivery system is designed to be readily convertible from use with a warewashing system to use with a laundry system, or vice-versa, merely by the replacement of one chip in the controller of the system. The dispensing system is also readily expandable by adding additional satellite pumps in order to inject additional chemicals into a single washing unit, and/or to supply chemicals to additional washing units. Plug and play technology is used so that control intelligence can be distributed from the main system controller to satellite controllers, and so that additional satellite units may be readily added, identified, and properly integrated into the dispensing system.

19 Claims, 4 Drawing Sheets

U.S. PATENT DOCUMENTS

| | | |
|---|---|---|
| 6,319,420 B1 | 11/2001 | Dow |
| 6,336,468 B1 * | 1/2002 | Cords .......................... 137/239 |
| 6,349,440 B1 | 2/2002 | Amberg et al. |
| 6,423,280 B1 | 7/2002 | Tarara et al. |
| 6,529,127 B2 | 3/2003 | Townsend et al. |
| 6,792,637 B2 | 9/2004 | Reichold et al. |
| 6,892,143 B2 | 5/2005 | Howes et al. |
| 2001/0049846 A1 | 12/2001 | Guzzi et al. |
| 2002/0096537 A1 | 7/2002 | Gardner, Jr. |
| 2003/0012081 A1 | 1/2003 | Jungmann et al. |
| 2005/0149273 A1 | 7/2005 | Peterson et al. |

OTHER PUBLICATIONS

European Patent Office 0 478 888 Apr. 1992.*

* cited by examiner

UNITECH LAUNDRY FORMULA TABLE
NORMAL
RUN
MODE

| FORMULA #(1-20) | WASH SIGNAL INPUT (1-8) | LEVEL (1-3) | PUMP # TO RUN | PUMP N DELAY TIME (1 BYTE) | PUMP N RUN TIME (2 BYTES) | TOTAL BYTES REQUIRED |
|---|---|---|---|---|---|---|
| 1 | 1 | 1 | 1 | t1 | t2 | 6 |
| 1 | 1 | 2 | 1 | t3 | t4 | 6 |
| 1 | 1 | 3 | 1 | t5 | t6 | 6 |
| 1 | 2 | 1 | 2 | t7 | t8 | 6 |
| 1 | 2 | 2 | 2 | t9 | t10 | 6 |
| 1 | 2 | 3 | 2 | t11 | t12 | 6 |
| 1 | 3 | 1 | 3 | t13 | t14 | 6 |
| 1 | 3 | 2 | 3 | t15 | t16 | 6 |
| 1 | 3 | 3 | 3 | t17 | t18 | 6 |

FIG. 5

MODULAR DUAL-PURPOSE CHEMICAL DISPENSING SYSTEM FOR LAUNDRY OR WAREWASH

This application claims the benefit under 35 U.S.C. 119(e) of the filing date of Provisional U.S. Application Ser. No. 60/658,277, entitled Modular Dual-Purpose Chemical Dispensing System for Laundry or Warewash, and filed on Mar. 3, 2005, which application is expressly incorporated herein by reference.

This invention relates generally to methods and apparatus for controlling the distribution of chemical solutions into one or more washing chambers, and more particularly to a dual purpose dispensing system which is applicable for use in either laundry or warewashing systems with minimal adaptation, and is modular in order to accommodate variously sized washing systems.

BACKGROUND OF THE INVENTION

Chemical products such as cleaning compounds are used extensively in many cleaning processes, such as commercial laundering and warewashing. In such applications, one or more laundry or dishwashing machines may require one or more chemical cleaning products to be delivered at different times during their wash cycles. Originally, individual dispensers were used to deliver single chemical products to individual machines. However, because of cost and environmental concerns, dispensing systems have been developed for selectively delivering one or more chemical cleaning products, such as detergent, rinse agents, or softening agents, to a plurality of laundry or warewashing machines.

In prior art dispensing systems of this type, the chemical agents are supplied in concentrated form, such as solid, liquid, granulated, or powdered, and are mixed with a diluent such as water to form use dilutions that are thereafter distributed to each machine as required. Often, the quantity of each chemical agent/dilution delivered must be carefully controlled to ensure optimum cleaning performance. In addition, different use dilutions may need to be separated from one another to prevent incompatible chemical products from reacting with one another. Segregation of use dilutions is typically performed by delivering discrete quantities of diluent between use dilutions to "flush" any residual use dilutions from the system.

Drawbacks of available prior art systems include the need for custom applications for different types of washing systems and for different quantities of washing machines to be serviced by a single chemical delivery system, as well as the difficulty of retrofitting existing washing systems with upgraded chemical delivery control systems.

What is needed, therefore, is a chemical delivery system which is easily adaptable to a number of different washing systems, including both warewashing and laundry systems, as well as to washing systems having varying numbers of washing machines, and in particular, is modular in nature and suited to being retrofitted into existing washing systems.

SUMMARY OF THE INVENTION

The present invention satisfies the above identified need by providing such a modular chemical delivery system, which is readily adaptable from use with a warewashing system to use with a laundry system, or vice-versa, merely by the replacement of one chip in the controller of the system. The inventive system is also readily expandable to inject additional chemicals into a single washing unit, and/or to supply chemicals to additional washing units using plug and play technology to simply add additional peripheral units, such as satellite pumps, to the system.

More particularly, there is provided, in one aspect of the invention, a modular chemical dispensing system for use in wash systems. This system comprises a main controller having a microprocessor and a user interface, at least one peripheral unit connected to the main controller, and an intelligent interface for connecting the at least one peripheral unit to the main controller. The microprocessor in the main controller is programmed to provide operating instructions to the at least one peripheral unit during a wash cycle, in order to ensure that desired quantities of chemicals are dispensed into the wash system at desired times.

The inventive dispensing system is extremely versatile, in that it may be adapted for use in a laundry washing system by insertion of a first integrated circuit chip into the main controller, and may be converted for use in a warewashing system by replacement of the first integrated circuit chip with a second integrated circuit chip. In preferred embodiments, the main controller comprises a housing, and two units to be instructed by the main controller are disposed within the housing. These two units are in direct communication with the microprocessor, typically by hard wiring, though they may, of course, also be connected via a smart bus, as are the peripheral units, or by other wireless means. In some embodiments, including a warewash embodiment discussed in this application, the two units comprise a pair of pumps, the first of which dispenses detergent, and the second of which dispenses a rinsing agent. In other embodiments, including a laundry washing embodiment discussed in greater detail hereinbelow, the second of the two internal units may comprise a water solenoid, while the first comprises a pump. The at least one peripheral unit typically comprises a satellite pump. Advantageously, the present system employs a distributed intelligence model, such that the satellite pump includes its own local control unit.

In most preferred embodiments, the at least one peripheral unit comprises a plurality of satellite pumps, and each satellite pump dispenses a different chemical agent into the wash system.

As noted above, the interface connecting the at least one peripheral unit to the main controller preferably comprises a smart bus which interrogates the at least one peripheral unit when it is connected, in order to detect and control the newly connected peripheral unit, using plug and play technology.

Particularly in the case of a warewashing system, the at least one peripheral unit may include an inductive probe for detecting detergent concentration during operation of the wash system.

As noted above, additional peripheral units may be added to accommodate a second wash system, and even additional wash systems beyond that. Each peripheral unit comprises a discrete module which may be connected into the dispensing system merely by connecting said module to said interface.

In another aspect of the invention, there is disclosed a method of converting a chemical dispensing system from usage with a first type of wash system to usage in a second type of wash system, wherein the dispensing system comprises a main controller and at least one pump connected to the main controller. The method comprises a step of removing a first integrated circuit chip from the main controller and a step of inserting a second integrated circuit chip into the main controller. The two presently contemplated wash systems are a warewashing system and a laundry system, and the conversion noted herein can be performed in either direction; i.e. from warewashing to laundry or vice-versa.

In still another aspect of the invention, there is disclosed a further method of modifying a modular chemical dispensing system for use in a wash system, wherein the dispensing system comprises a main controller and a smart interface for connecting peripheral units to the main controller. The inventive method comprises a step of connecting a peripheral unit to the smart interface. A second method step involves initiating an interrogation sequence between the main controller and the newly connected peripheral unit for the purpose of identifying the newly connected peripheral unit. Then, software programmed into the main controller suitable for the newly identified peripheral unit is applied in order to begin controlling the newly identified peripheral unit.

The invention, together with additional features and advantages thereof, may be best understood by reference to the following description taken in conjunction with the accompanying illustrative drawings. In these accompanying drawings, like reference numerals designate like parts throughout the figures.

DESCRIPTION OF THE PREFERRED EMBODIMENT

The present system, sold by the assignee, Knight LLC of Lake Forest, Calif., under the trademark UNITECH™, is a modular system suitable for use with both warewash and laundry systems. The system will be described in connection with both warewash and laundry applications. The modularity of the system, including an advantageous capability for readily modifying the control unit for use with either warewash or laundry systems, as well as its ability to be adapted for use with varying numbers of washing units and pumps, is also discussed hereinbelow.

Figure 1:
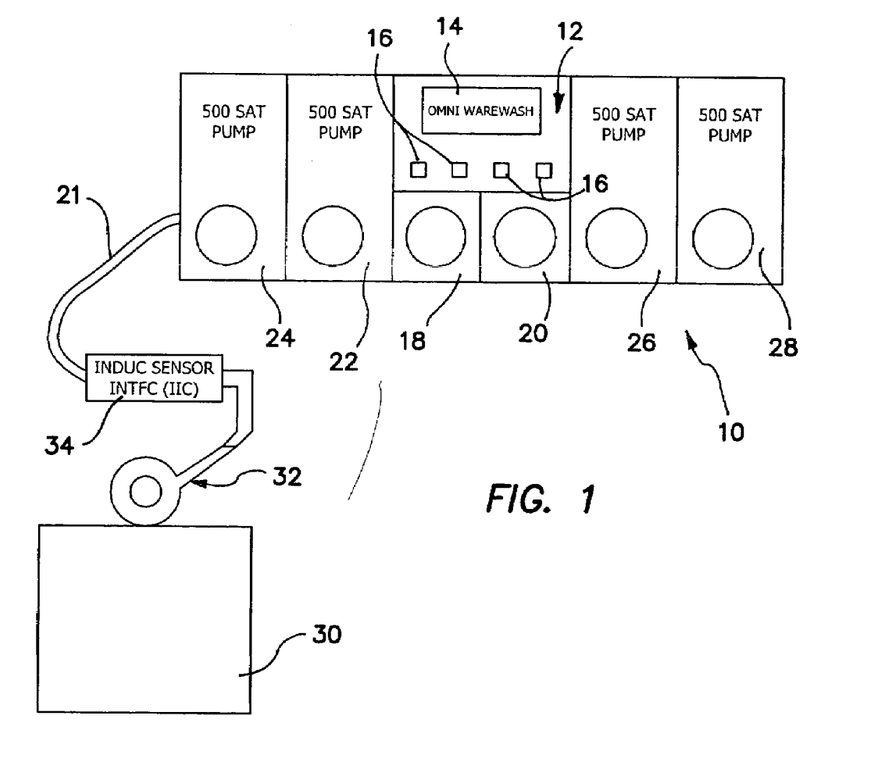
FIG. 1 is a schematic view illustrating one example of a warewash system as described in the present invention.

In FIG. 1 there is illustrated a representative warewashing system 10 according to the present invention. The illustrated system is defined as a Warewash Tier 3 system. It is a modular system with a main controller 12, a display 14, and a user interface or keypad 16. Four buttons are disposed on the keypad 16, of the momentary contact push button type, and respectively labeled "UP", "DOWN", "ENTER", and "SCROLL". Two pumps 18 and 20 are disposed in the main enclosure 12. One additional pump can be added for sanitizer. This is called a satellite pump. It is controlled locally with a satellite controller PCB (printed circuit board) that interfaces with the main controller 12 over a standard two-wire synchronous serial data/control bus 21 called an IIC.

In a preferred embodiment, the main controller 12 utilizes a Microchip PIC 18F452 single-chip microcontroller. The controller software is written in ANSI Standard "C" code, and compiled to PIC 18F452 code. The compiled code resides in on-board FLASH memory. The run-time parameters and logged run-time data is stored in on-board EEPROM. The IIC bus of the PIC18F452 attaches to all of the satellite modules for bi-directional communication.

A standard warewash pump configuration which can be employed in the present inventive system provides that pump 18 is a main left pump, for pumping detergent, and pump 20 is a main right pump, for pumping rinse water. A first satellite pump 22 may be provided for supplying sanitizer If desired, other satellite pumps 24, 26, and 28 may be employed as well, for distributing different types of chemical agents or for distributing similar chemical agents to differing numbers of warewash machines, as will be more fully explained hereinbelow.

The main controller module 12, in a preferred embodiment, supplies 24 volt DC power to each satellite pump module. Power and IIC serial data bus are supplied to the satellite modules using a standard four-pin connector. All programming for the system is accomplished using the four keyboard buttons 16 on the main controller module 12. A single-chip RISC-based micro-computer, having FLASH program memory so that it can be re-programmed many times, is provided within the main controller module 12 for controlling all functions for the two pumps or solenoids 18, 20 mounted in the main controller module 12, including all time dispensing and motor speed control functions.

Advantageously, each satellite pump 22, 24, 26, 28 have their own individual satellite controller housed therein, having sufficient processor capability to be able to control when the corresponding satellite pump turns on and how fast it runs. The main controller 12 sends commands and run time data to each satellite controller to coordinate these functions. As noted above, the main control unit 12 stores all programmed features and run-time data in on-board EEPROM (non-volatile memory) in the main controller module. All input control signals and output drivers for the attached pumps are mounted on the main controller PCB.

The warewash units themselves are those available in the prior art, or which are expected to be available by various manufacturers in the future, and one such unit 30 is illustrated in FIG. 1. The unit 30 itself is not a part of the inventive system, and may, for example, be of the type disclosed in U.S. Pat. No. 4,733,798 to Brady et al., which is herein expressly incorporated by reference.

In addition to a standard conductivity probe that connects to an internal power and signal terminal block on the main module 12, an external Inductive Probe module 32 can be attached to a standard four-pin data and power bus that is accessible from the outside of the module 12. The Inductive Probe module 32 may be of the type disclosed in co-pending U.S. application Ser. No. 10/949,167, filed on Sep. 24, 2004, and commonly assigned herewith. The '167 application is herein expressly incorporated by reference. The probe is installed in the wash tank below the water level.

Advantageously, each component attachable to the core module 12 of the present system has a unique identifying code stored in micro FLASH memory that may be read by the controller 12 to determine what type of attachment it is. When more than one of the same type of attachment can be connected, each one has a unique number set with DIP switches so that they can be distinguished from one another. At power-up, the main controller 12 interrogates the IIC bus to detect and control new satellite attachments. This provides an important "plug and play" capability. Once the attachments have been identified, the controller 12 modifies the start-up menu steps to provide setup parameters for all attachments.

The warewash system as above described is designed to satisfy customer requirements, including reliability, performance, serviceability, installation ease, cost, innovation, and aesthetics.

In operation of a typical warewash system 10, using the inventive UNITECH technology, when power is first applied to the controller 12, it will automatically go into the RUN mode, and start looking for Rinse and Detergent input signals from the warewash machine. The controller turns on pumps based on the state of the input signals and the operating mode which the user has selected. The controller also automatically interrogates the IIC bus every five seconds (or a different time period, if desired), to determine what additional modules may have been attached since the last interrogation. Satellite codes are assigned for each type of attachment module. During IIC interrogation, the main controller 12 steps through all of the valid satellite codes from number 1 to the maximum number allowed for the system. Each attached satellite module answers back to the main controller 12 whenever it recognizes its unique code and number.

The main controller 12 stores programmed data for each attached satellite module in its non-volatile memory. If all satellite modules have already been programmed with run time and speed data, the main controller 12 controls their on and off times based on input signals from the dishwasher or dishwashers connected to the system.

If one or more of the attached modules have not yet been programmed, the main controller 12 identifies the un-programmed satellite module on the display 14, which is presently contemplated to be a liquid crystal display (LCD), and prompts the operator to set run parameters for that un-programmed module. This process is repeated until all un-programmed satellite modules have been programmed. The main controller 12 transmits some run time parameters, such as pump speed, to each attached satellite module. The satellite modules each store the pertinent data in their on-board EEPROM, and shall use that data when running the satellite pump.

If an inductive probe interface 34 is attached to the system, for interfacing the controller 12 with the external inductive probe module 32, the interface 34 takes a reading from the inductive sensor 32 whenever it is commanded to do so by the main controller 12, and transmits that reading to the main controller. The main controller displays the detergent concentration reading received from the inductive sensor 32 in the same way that it would otherwise display the conductive sensor reading. If the controller 12 is set to run in probe mode, and both conductive and inductive sensors are connected, the system will read both and give priority to the inductive reading for concentration control and display.

When the operator wishes to change the operating parameters, pressing one of the buttons 16 which is labeled ENTER, for at least two seconds, causes the controller 12 to go into programming mode. The controller 12 continues to read and process Detergent and Rinse input signals in the program mode.

In preferred configurations, there are four alternative wash cycle operating modes. One such mode is the detergent probe mode. In this regime, the wash tank in the machine 30 fills for the first time through a fill solenoid, which can be either manual or automatic. Once the tank is full, the wash cycle starts. This is usually about 60 or 70 seconds. The wash signal is applied automatically to the Detergent signal input of the main controller 12. The controller 12 automatically detects the detergent signal and the concentration probe starts detecting the detergent concentration of the water in the wash tank.

If the detected concentration is less than the predetermined detergent concentration set point, the Warewash controller 12 turns on the detergent pump 18 and keeps it on until the detergent concentration set point is reached, or until the feed limit is exceeded if the detergent feed limit mode is selected. If the detergent feed limit system has been activated, the detergent pump 18 will continue to run for one more alarm delay time, or until the concentration set point is reached. The alarm will alternate on and off every second. If the feed limit time is reached before the concentration set point is reached, the detergent pump 18 will be stopped, and the alarm will blink on and off continuously.

If the optional sanitizer satellite pump 22 is selected to run with the detergent pump 18, it will be turned on and off simultaneously with the detergent pump. In door mode, when the Rinse signal is detected at the Rinse Signal In input, the controller 12 waits for the programmed rinse delay time, then turns on the rinse pump 20 for the duration of the rinse signal input, or until the pre-programmed rinse limit time is reached.

A second alternative wash cycle operating mode is the so-called probeless mode. In this mode, the wash tank fills for the first time. Then, an initial detergent charge starts when an input signal is first seen on the Detergent Signal input. The initial detergent charge finishes even if the detergent signal ends before the initial charge time is completed. The detergent input signal can stay on indefinitely, but the initial charge occurs only once.

After main power has been applied to the main controller 12, and the initial detergent charge has been completed once, the initial charge will be repeated whenever the Detergent Input Signal transitions from off to on. The detergent pump 18 runs for the programmed initial charge time once and finishes regardless of the state of the detergent input signal. The initial charge does not start over if it is in progress, even if the detergent signal transitions off then on during this time.

Detergent recharge occurs when the cumulative total "Rinse On" time equals the rack time multiplied by a predetermined "recharge after n value". The rinse signal does not have to be on continuously, but may transition off then on again multiple times while the total on time is accumulating. For example, in one case the recharge time might equal 15 seconds per rack multiplied by 4 racks before recharge, or a total of 60 seconds. Thus, in this example, the rinse signal must be on for a total of 60 seconds before recharge occurs. Another rack is counted whenever the rinse signal has been on for the programmed rack time. Rinse feed can run simultaneously with detergent in any mode, probe or probeless. Rinse limit only works in DOOR mode, so rinse feed will run as long as the rinse signal is on when the setting "Conveyor" has been selected. There is no rinse delay after the rinse signal first transitions on from off.

A third alternative wash cycle operating mode is referred to as the Probeless mode and door machine. In this operating regime, either the detergent signal or the rinse signal is input, but not both. When the detergent initial charge is due to the detergent signal, operation proceeds similarly to operation under the above described Probeless and Conveyor mode. When the detergent initial charge is due to the rinse signal, if power is applied to the unit 12 from either the detergent power or rinse power input, and the rinse signal is applied to the rinse signal input continuously for at least 30 seconds, the warewash controller 12 assumes that an initial wash tank fill is in process, and it runs the detergent pump 18 for the programmed initial charge time once. The display 14 indicates whenever the detergent initial charge is in progress.

Regardless of whether the detergent initial charge is due to the detergent signal or to the rinse signal, the controller 12 turns on the detergent pump 18 for the programmed detergent recharge time whenever the rinse input signal transitions off and on for n times, where n represents the programmed recharge after n racks. The controller 12 is programmed to run the detergent pump with no delay whenever this occurs. The display 14 indicates that detergent recharge is taking place. The rack counter increments every time the rinse signal input transitions from off to on.

A fourth alternative wash cycle operating mode is referred to as the Probeless mode and flight machine. In this mode, there are no racks and detergent and rinse are always running. The initial charge, recharge, and rinse feed control are performed in the same manner as the Probeless and Conveyor mode, and the controller 12 is set to run in the Probeless and Conveyor modes. For recharge, the estimated rack time multiplied with recharge after n racks is calculated. When the cumulative total rinse on time equals this calculated number, recharge is initiated.

The warewash controller 12 includes an alarm light emitting diode (LED) and piezo buzzer, or other suitable visual and aural alarms, which is mounted on the PCB, with two terminals for connecting an external buzzer, if desired. The alarm is activated whenever the alarm limit time is reached, before the detergent concentration set point is reached. The alarm delay operates only in probe mode. The detergent signal (or power in a two transformer version) must be on for the alarm to count down. Alarm delay is time allowed to dispense enough detergent to reach the predetermined concentration set point. There are two ways to start the alarm delay timeout. One way is to start it using the detergent signal input, and a second way is to use the detergent power in the two transformer mode. One of these two inputs must be present for the alarm delay to time out. In a single transformer system, an interrupt in the detergent signal in will start the time out over gain. In a two transformer system, if the detergent power is cycled off and on again, the time out will start over. If the alarm is on, the display 14 shows the message "check detergent supply", and blinks this message on and off. The LED and buzzer also turn on and off at one second intervals.

In one example, wherein a feed limit is not selected, if the alarm delay time is reached, the alarm visual and audio components cycle intermittently until it is reset as described above. The detergent pump 18 continues to run along with the alarm. If the detergent concentration set point is reached when the alarm is on, the alarm is shut off (both audio and LED components), and the alarm time out is reset. The display 14 reverts to normal display.

In a second example, or case, wherein a feed limit is selected (ON), if the alarm delay time is reached, the alarm visual and audio components continue to cycle intermittently until it is reset as described above. The detergent pump 18 continues to run for an additional alarm delay time and then shuts off if the set point is not reached by the end of the second alarm time. The LED and audio components are continuously activated during this condition.

If the detergent concentration setpoint is reached before the end of the second alarm time, the alarm is shut off (both audio and visual), and the time out is reset. The display 14 reverts to normal display. The alarm always resets whenever the detergent signal goes off then on again, or the detergent power is cycled off, then on.

Exemplary specifications for a typical warewash application are as follows: maximum number of pumps per wash unit—3 (detergent (liquid or water solenoid), rinse, sanitizer). The detergent pump 18 runs at full speed in all modes except when the detergent concentration approaches the concentration set point in probe mode. The detergent pump will begin to pulse on and off at an increasingly lower duty cycle as the wash water nears the detergent concentration set point. This is called pulse feed mode, and operates with either liquid or dry detergent. It provides for minimum time to reach set point with minimum overshoot of the detergent concentration set point.

Probeless mode operation is for machines that fill through the rinse solenoid. A concentration probe correction factor automatically adjusts the concentration curve as probe contamination builds due to protein and hard water deposit. A clean water reading is used to adjust scale factor to prevent overdosing.

In detergent probe mode, the inventive system uses an advanced closed-loop feedback software algorithm that minimizes the time required to reach the concentration set point while minimizing overshoot. It senses the rate of detergent concentration increase and continuously adjusts the feed rate to reach set point quickly and to maintain the set point under widely varying machine operating conditions.

Figure 2:
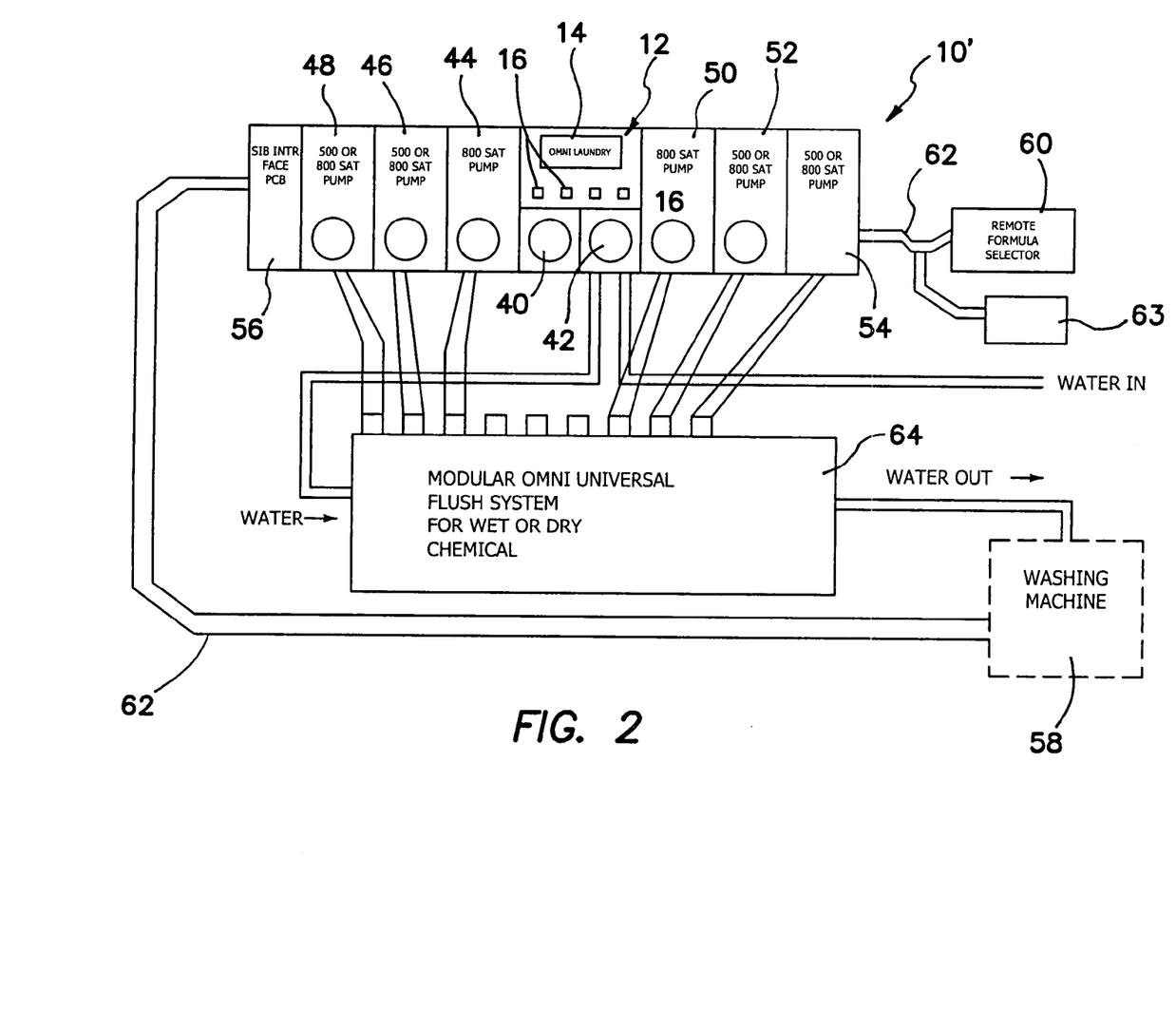
FIG. 2 is a schematic view illustrating one example of a laundry system as described in the present invention.

In FIG. 2, there is shown a representative laundry system 10' which employs a main controller 12, similar to the controller 12 in FIG. 1. Laundry system 10' is defined as a Laundry Tier 3 system. It is a modular system with the main controller PCB 12, display 14, and keypad 16, having four buttons, as in the FIG. 1 embodiment. Two 500 pumps may be mounted in the main enclosure 12, or, alternatively, as shown, there may be one 500 pump 40 and a water solenoid 42. It can have up to eight additional pumps attached to either side of the main controller in any combination of types 500 and 800 peristaltic pumps or dry detergent dispensers. These pumps 44, 46, 48, 50, 52, and 54 are satellite pumps. Each is controlled locally with a satellite controller PCB that interfaces with the main controller 12 over a standard two-wire synchronous serial data/control bus called IIC, as in the above described warewash embodiment.

The main controller module 12 supplies un-regulated 24 volt DC power to the satellite pump modules. Power and IIC serial data bus are supplied to the satellite modules using a standard four-pin connector.

Optional user interfaces such as a Modified Frequency Modulation (MFM) hand-held remote drive and Signal Input Board (SIB) 56 can be added to the system to increase functionality. The SIB converts high voltage supply signals from the washer to a low voltage data transmission. The user interface is located on or near the washing machine 58. The main controller 12, with pumps, may mount behind the washing machine 58 and may not be easily accessible for direct programming and control.

All systems also have the option of a Signal Interface Module (SIM) that uses electrical signals from the washer to control the dispensing of chemicals. This increases the basic functionality of the unit.

As is the case with the FIG. 1 embodiment, main controller programming is accomplished using the four button interface of the keyboard 16. A remote programmer/controller 60 and/or the Signal Input Module (SIM) connect to the main controller 12 over a standard interface bus 62. The main controller 12 includes a single-chip RISC-based microcomputer that has FLASH program memory so that it can be re-programmed many times. The main controller 12 receives signals and data from the user interfaces and/or SIB and uses these to turn the individual chemical pumps on and off at the required times. The unit stores all programmed features and run-time data in on-board EEPROM (non-volatile memory) in the main controller module.

Each attachment to the main controller 12 has a unique identifying code stored in micro-flash memory that the controller 12 can read to determine what type of attachment it is. When more than one of the same type of attachment can be connected, each one is provided with a unique number set with DIP switches so that the controller 12 can distinguish between them.

The main controller 12 continuously interrogates the IIC bus to detect and control new attachments. This provides "plug and play" capability. The controller 12 also functions to modify the setup menu steps to provide setup parameters for all attachments.

The inventive laundry system 10' is modular on a number of levels. The base of the system is the main controller 12, and its ability to hold two 500 series pumps. Pumps of both 500 and 800 series can be extended on either side of the base unit. Powder dispensers can also be added in the same way. The maximum number of products are limited to eight.

A number of options are available for the user interface (LFS, LFP, etc.), and a number of modules can be added to increase functionality (data logging, increased formulas, multi-washer options).

The inventive system 10' is particularly adapted for applications including top load or on-premise laundry machines 58 in nursing homes, restaurants, motels, shirt laundries, hotels, and other institutions. Key features include a capability for up to six different chemical products which may be dispensed, and plug and play cable connection.

Figure 3:
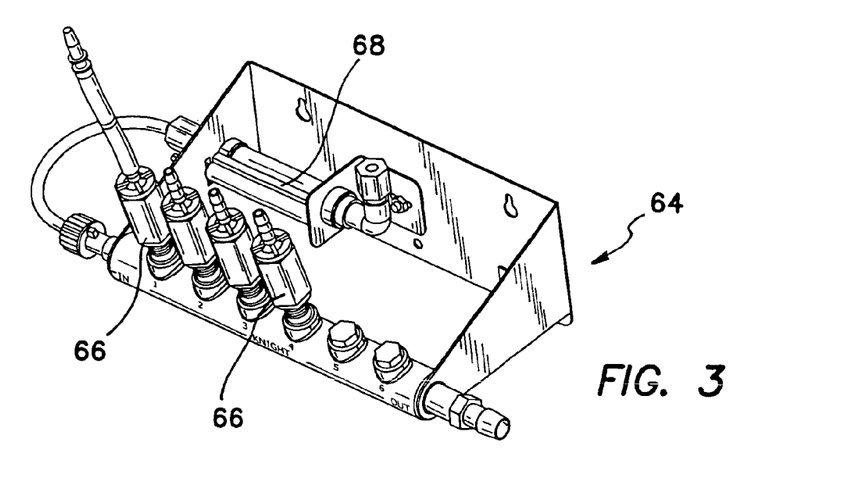
FIG. 3 is a perspective view of an optional flush manifold as it may be employed in the present invention.
Figure 4:
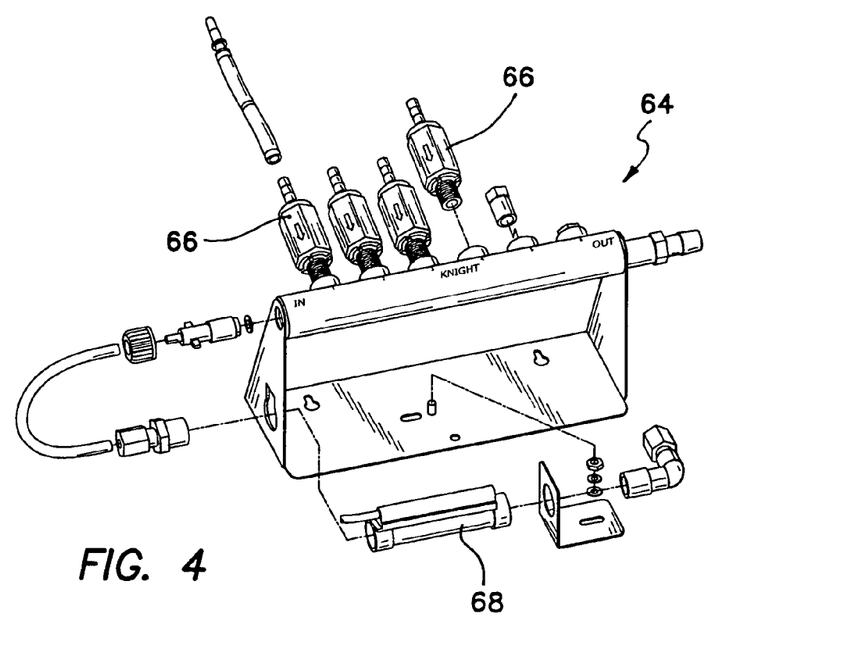
FIG. 4 is a perspective view from a different orientation of the flush manifold shown in FIG. 3.

In FIGS. 2-4, there is shown an optional high/low flow flush system or manifold 64, which may be connected to the system 10' to offer an increased level of safety for operators as well as protection against corrosion to the washer 58 and chemical burn to the fabrics. When the highly corrosive laundry chemicals are dispensed by the peristaltic pumps into the flush manifold 64, the unique flush mode of the control opens a built-in water solenoid 42 to provide a diluted flush to the washer through a single injection line. Concentration chemicals can thus be dispensed with less chemical shock to the fabrics being washed. The external high flow check valves illustrated prevent back-siphoning as well as cross contamination of chemicals. The flush manifold features include the aforementioned water inlet solenoid 42, an optional proof of flow switch, a pressure regulator, a water inlet back check valve, an injection molded eight port manifold with high flow check valves, nylobraid tubing and barb fittings, and a new robust "ball" check valve with optional Viton or EPDM o-ring.

Considering again the basic system 10', an advantageous feature of the invention is a user interface which is situated in front of the washing machine 58, and allows the operator to select any of formulas 1 through 20. This interface also displays the currently selected detergent formula.

Another important feature of the present invention is the provision of an interface which allows multiple systems 10' to be connected to each other, and to also provide plug and play access to existing local area networks (LAN's) within the laundry area. This interface provides remote access for uploading reports and downloading software updates.

A module may be provided permitting a single system 10' to deliver product to up to four washers 58. In addition to the module, a system to direct the product to the correct washer 58 and a transfer system is provided. This module is particularly advantageous in that it permits existing laundry systems from different manufacturers to be retrofitted with this function.

In operation, the inventive laundry chemical delivery system is installed so that the main controller 12 and connected pump components are mounted on the wall behind the washing machine 58, and the SIB and MFM mount on or near the front of the washing machine 58 for easy access. Communication is initiated with both the SIB and MFM, and turns the chemical pumps on and off based on the information received from the SIB and MFM.

The washing machine 58 signal outputs are connected to the SIB module. The SIB continuously monitors the state of these signals and uploads the state of these signals to the main controller 12 over the IIC bus 62 whenever the main controller 12 requests the information. The multi-function remote module 60 also connects to the main controller over the IIC bus 62. The operator uses this module to program the system with all of the run-time parameters. The MFM stores all programming information in local non-volatile memory. The MFM uploads the program information to the main controller 12 whenever it is requested by the main controller.

The MFM stores and uploads all timing and programming functions. The main controller 12 uses the pump delay and run times that are stored in the MFM. The parameters are based on what formula number has been selected. The formula can be selected using the MFM without going into the setup menus. The main controller 12 does the actual driving of the pumps. The length of time that the pumps run is based on the programmed run times or volume amounts stored in the MFM local non-volatile memory.

Figure 5:
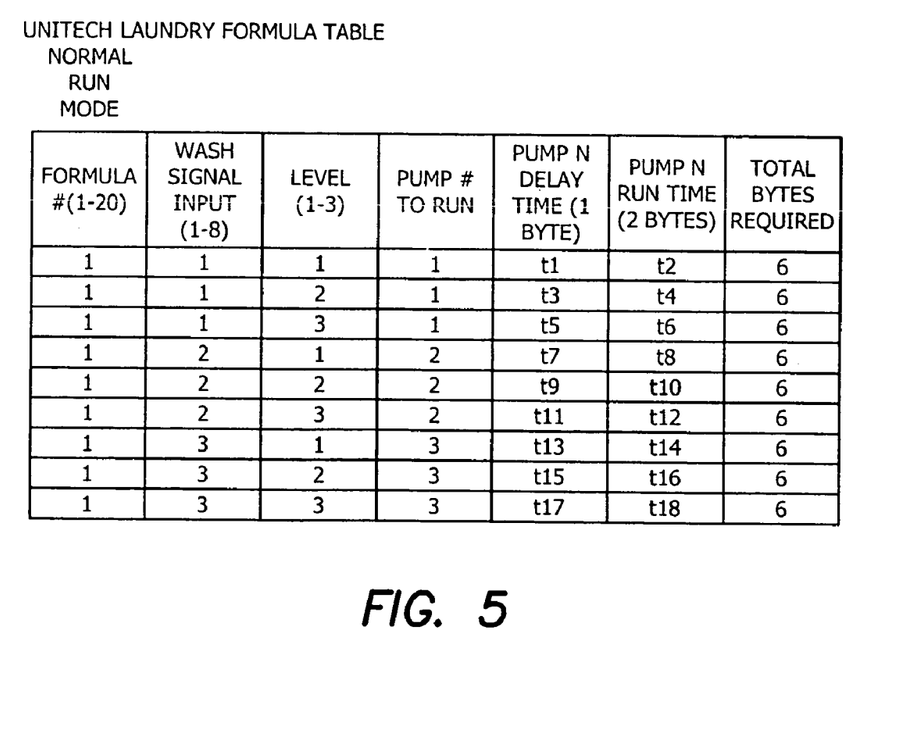
FIG. 5 is a table showing one example of some of the laundry detergent formulas which can be programmed for use in the present invention.

FIG. 5 is a table which is merely illustrative of a typical laundry formula scheme, as has been described above.

The inventive laundry system can operate in one of three modes, namely, Normal, Drain, or Relay. If Normal mode is selected and Auto Formula Select is disabled, it will use the pre-selected formula to run. If Auto Formula Select is enabled, then the formula is selected as described below.

Normal Mode

After the system is powered up, the main controller 12 queries the IIC bus 62 in the same manner as described above in connection with the warewash system to detect all satellites that are connected. It will display each one that is found on the LCD 14 for several seconds for the operator to verify. If a new satellite is detected, it will display a message indicating this, and prompt the operator to set its parameters (if appropriate) immediately, or wait until later. If duplicate satellite addresses and sub-addresses are found, it will display this message, and force the operator to correct the duplicate before continuing. The system will not run until all connected satellites have been properly configured by the operator.

Once all attached satellite pumps have been identified, the main controller 12 automatically transmits the numbers corresponding to each pump to the MFM, if the optional MFM drive is attached. The pumps are preferably numbered from 1 to N. In the preferred embodiment, the maximum value for N is 8, though the invention is sufficiently broad to include systems having greater numbers of pumps, if desired.

Configuration can take place in the setup menus of the main controller 12 or MFM hand-held controller 63. Only the MFM has enough memory to store all setup parameters and run time data for up to twenty user selectable formulas. Once one or more formulas have all been set in the MFM, the MFM will automatically transmit the selected formula to the main controller 12. The main controller 12 must download to the SIB.

If no MFM or other peripheral with non-volatile memory is attached to the main controller 12, the main controller shall default to whatever formula is set in its internal non-volatile memory. The main controller PCB has sufficient non-volatile memory for up to eight sets of formula data and the other run time parameters. The limitations are caused because, for each formula, unique run times and delay times must be stored for each main and peripheral pump. As technology improves in the future, the capacity to accommodate additional formulas in both the main unit 12 and in the MFM will undoubtedly increase.

As long as power is applied, the SIB will continuously read incoming wash signals and upload signals that stay on for the minimum preset washer signal qualify time.

The separate AFS signal does not have any signal qualify time. This is because the total on time for this signal determines the required formula in micro mode and requires a fixed on time in chart mode to read the other wash signals accurately.

A formula is a table of chemical pump delay and run times that are triggered by individual wash signal inputs received from the washing machine 58 in Normal Run mode or by a single Drain Count wash signal input when running in Drain mode.

Drain Mode

If the Drain mode is selected, each activation of the single Drain Signal input during a wash cycle causes one of the pumps in the selected formula to run its preset delay and run time for the selected level. The Drain mode uses the same formula delay and run times as the normal run mode. Thus, the single drain mode wash signal input takes the place of multiple wash signal inputs to run all of the required chemical pumps during a wash cycle.

The MFM is capable of storing up to 20 user selectable formulas with each formula having unique run times and delay times fo reach pump attached to the main controller 12. Signals from the washer trigger the starting of pump delay and run times through the SIB, then the main controller 12 counts down delay times and run times with up to 3 individual "levels" for each pump.

Programming "levels" permit a pump to inject different amounts of chemical for multiple signals to the same pump during a formula in Normal run mode. For example, pump 1 could inject 8 ounces of chemical on its first signal, then later inject 12 ounces of chemical on its second signal. This comprises levels 1 and 2. Up to three levels are available for any pump on any formula, except for the load count pump.

Only one level is used with the load count pump, since the first occurrence of this signal ends the wash cycle.

The level feature can be used to skip over an injection, simply by not programming any volume or run times for that particular level.

In the SIB, when a formula begin (after the RESET button has been pushed or the "Load Count" pump has been triggered during a previous wash cycle), the first signal to a pump will activate level 1. The signal has to be present for at least the predetermined washer signal qualify time (in order to ensure that it is not a spurious transient) in order to be recognized. The second signal to the pump during the wash cycle will activate level 2. The third signal to the pump during the wash cycle will activate level 3. Any further signals will be disregarded once level 3 has been activated.

The load count pump can be programmed to run one delay and run time after its input signal goes active for the first time during a wash cycle. If any other pumps are in delay or run mode when the first load count pump signal goes active, they must finish their delay and run cycle before resetting the system and stopping the wash cycle.

If any other wash signals go active simultaneously with load count pump input and they have not run three levels yet, they must be initialized to run their programmed delay and run times. No more wash signals shall be accepted after the load count pump input signals have gone active for the first time during a wash cycle. The load count pump signal must be received to reset levels in preparation for the next formula. The load count signal always indicates the end of a wash cycle.

In the Drain mode, the initial operations are the same as in the Normal mode. This mode is similar to Normal mode and uses the same formula parameters, but requires only two signal sources from the washer 58 through the SIB, and works by counting the number of drain cycles that occur during a wash cycle. The Drain Signal is always assigned to Wash Signal number 1. When programming the MFN module for Drain Mode, each chemical pump is assigned a specific drain occurrence to inject product on. This feature only affects how the pumps are triggered. All other functions, such as pump run times, delay times, and flush mode, still operate in their normal fashion.

During a wash formula, each drain signal is counted and the pumps inject chemical according to the drain number that they are assigned. Drain mode is similar to normal operation, in that the pumps are programmed with run times (and delay times if necessary) and the flush mode works the same way it does in normal operation.

The multiple level feature works slightly different in drain mode, because of the way drain mode counts the number of signals to pump number 1 input. If a second injection level is required, it should be programmed to inject on a later drain number (occurrence) than the first level for that pump.

When the first drain count that is assigned to the load count pump is activated, this indicates the end of the wash cycle. The load count is incremented once and stored in the main controller 12 and in the MFM. After the load count pump runs its delay and run time (if greater than zero), and all other pumps are finished running, the drain count is set to zero and the wash cycle ends.

During a formula, when pumps are idle, the display of both the main controller 14 and the MFM shows the current drain count and the formula name. The MFM can be used to reset the drain count.

Relay Mode

The initial operations in Relay Mode are the same as in Normal Mode. This type of operation is typically used with microprocessor controlled washers 58. No run-time formula is used. When set to Relay mode, the multi-flow system will run its pumps as long as their respective wash signals are present, as detected through the SIB. To accomplish this, the system bypasses its run time and delay time capabilities for the chemical pumps.

Choosing a load count pump is still required. Load counts are tallied as a cumulative number and viewed in the typical manner. The load count pump also runs when its input signal is on. The load count pump does not shut off any other pumps. It does not signal the end of a wash cycle.

As noted above, a chemical flush option is available for use with the inventive system. This option is used to dilute the wash chemicals, flush the chemicals to the washer 58, and to prevent harmful reactions between chemicals by flushing the manifold after each chemical is injected individually.

The flush manifold 64 has one-way valve inlet ports 66 (FIGS. 3 and 4) for each chemical pump on the main controller, a water solenoid 42 for allowing pressurized water to enter the system, and an optional flow switch 68. If a flush manifold 64 is attached to the system, the flush parameters must be set in the programming mode. If a flow switch 68 is included with the flush manifold 64, the flush flow check delay time must also be set. If water flow is not detected after the flow check delay time has expired, the system must stop pumping chemicals and set an alarm.

To summarize, the present invention incorporates at least the following advantages. First, it is to Applicants' knowledge the first chemical delivery system which is multi-purpose, as it is readily adaptable to either warewash or laundry applications merely by changing out one integrated circuit chip on the main PCB of the controller 12. Second, the system is designed to use smart bus modules, in order to be almost infinitely expandable using modular "plug and play" components, as has been above explained. Third, the system employs either an inductive or conductive probe for detecting detergent concentration, particularly during warewash function. Fourth, the above mentioned smart bus permits the employment of a "distributed intelligence" model, wherein there are local controllers in each satellite peripheral in order to "hand off" many of the particularized control aspects to each local unit, rather than forcing the main controller 12 to handle all of these functions. This approach greatly increases speed and efficiency of operation. Finally, the present system enables the conversion of a single washer system to a multi-washer system, because there is an almost limitless capacity to add satellite pumps to each main controller 12.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A modular chemical dispensing system for use in wash systems, comprising:
    a main controller having a microprocessor and a user interface;
    a peripheral unit connected to the main controller;
    an interface for connecting the peripheral unit to the main controller, said interface comprising a synchronous serial data/control bus (IIC); and
    a local control unit for said peripheral unit;
    wherein the microprocessor in the main controller is programmed to provide operating instructions to the peripheral unit during a wash cycle, in order to ensure that desired quantities of chemicals are dispensed into the wash system at desired times, and the local control unit is programmed to control particularized operating functions of the peripheral unit, thereby relieving the main controller of those functions and increasing the response speed of the chemical dispensing system.

2. The dispensing system as recited in claim 1, wherein the system is adapted for use in a laundry washing system by insertion of a first integrated circuit chip into the main controller, and is adapted for use in a warewashing system by replacement of said first integrated circuit chip with a second integrated circuit chip.

3. The dispensing system as recited in claim 1, wherein the main controller comprises a housing, and two units to be instructed by the main controller are disposed within said housing, said two units directly communicating with said microprocessor.

4. The dispensing system as recited in claim 3, wherein said two units comprise a pair of pumps.

5. The dispensing system as recited in claim 4, wherein one of said pumps dispenses detergent, and the second of said pumps dispenses a rinsing agent.

6. The dispensing system as recited in claim 3, wherein a first of said two units comprises a pump, and a second of said two units comprises a water solenoid.

7. The dispensing system as recited in claim 1, wherein the peripheral unit comprises a satellite pump.

8. The dispensing system as recited in claim 1, wherein the system comprises a plurality of peripheral units, and said plurality of peripheral units comprise a plurality of satellite pumps, wherein each satellite pump dispenses a different chemical agent into the wash system.

9. The dispensing system as recited in claim 1, wherein the synchronous serial data/control bus interface connecting the peripheral unit to the main controller interrogates the peripheral unit when it is connected, in order to detect and control the peripheral unit, using plug and play technology.

10. The dispensing system as recited in claim 1, wherein the peripheral unit includes an inductive probe for detecting detergent concentration during operation of the wash system.

11. The dispensing system as recited in claim 1, wherein the wash system comprises a warewash system.

12. The dispensing system as recited in claim 1, wherein the wash system comprises a laundry wash system.

13. The dispensing system as recited in claim 1, wherein the system comprises additional peripheral units to dispense chemicals to a second wash system.

14. The dispensing system as recited in claim 1, wherein said peripheral unit comprises a discrete module which is connected into the dispensing system merely by connecting said module to said interface.

15. A modular chemical dispensing system for use in wash systems, comprising:
    a main controller comprising a housing;
    a microprocessor disposed in said housing;
    a user interface disposed on said housing;
    a first pump disposed in said housing;
    a second pump disposed in said housing, wherein both the first pump and the second pump are directly connected to the microprocessor;
    at least one satellite pump disposed in spaced relationship from said housing;
    a synchronous serial data/control bus (IIC) connecting said microprocessor and said at least one satellite pump; and
    fluid connections for connecting each of said first pump, said second pump, and said at least one satellite pump to the wash system;
    wherein the microprocessor in the main controller is programmed to provide operating instructions to the first pump, the second pump, and the at least one satellite pump during a wash cycle, in order to ensure that desired quantities of different chemicals are dispensed into the wash system at desired times and in desired quantities.

16. The dispensing system as recited in claim 15, and further comprising a local control unit for said satellite pump, the local control unit being programmed to control particularized operating functions of the satellite pump, thereby relieving the main controller of those functions and increasing the response speed of the chemical dispensing system as a whole.

17. The dispensing system as recited in claim 15, wherein the system is adapted for use in a laundry washing system by insertion of a first integrated circuit chip into the main controller, and is adapted for use in a warewashing system by replacement of said first integrated circuit chip with a second integrated circuit chip.

18. The dispensing system as recited in claim 15, wherein said first and pump dispenses detergent, and said second pump dispenses a rinsing agent.

19. The dispensing system as recited in claim 15, wherein the system comprises additional peripheral units to dispense chemicals to a second wash system.

* * * * *

UNITED STATES PATENT AND TRADEMARK OFFICE
CERTIFICATE OF CORRECTION

PATENT NO.        : 7,658,088 B2                                           Page 1 of 1
APPLICATION NO. : 11/368357
DATED             : February 9, 2010
INVENTOR(S)       : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Thirtieth Day of November, 2010

David J. Kappos
*Director of the United States Patent and Trademark Office*